US010527458B2

(12) United States Patent
Teboulle et al.

(10) Patent No.: US 10,527,458 B2
(45) Date of Patent: Jan. 7, 2020

(54) DEVICE FOR COUNTING TURNS OF A WHEEL BY MEANS OF A COIL AND COUNTER EQUIPPED WITH SAID COUNTING DEVICE

(71) Applicant: SAGEMCOM ENERGY & TELECOM SAS, Rueil Malmaison (FR)

(72) Inventors: Henri Teboulle, Rueil Malmaison (FR); Jean-Michel Gaudin, Rueil Malmaison (FR); Paolo Moro, Rueil Malmaison (FR)

(73) Assignee: Sagemcom Energy & Telecom SAS, Rueil Malmaison (FR)

( * ) Notice: Subject to any disclaimer, the term of this patent is extended or adjusted under 35 U.S.C. 154(b) by 0 days.

(21) Appl. No.: 15/755,919

(22) PCT Filed: Jul. 21, 2016

(86) PCT No.: PCT/EP2016/067466
§ 371 (c)(1),
(2) Date: Feb. 27, 2018

(87) PCT Pub. No.: WO2017/032521
PCT Pub. Date: Mar. 2, 2017

(65) Prior Publication Data
US 2018/0328758 A1 Nov. 15, 2018

(30) Foreign Application Priority Data
Aug. 27, 2015 (FR) ..................................... 15 57961

(51) Int. Cl.
*G01B 7/14* (2006.01)
*G01D 5/20* (2006.01)
*G01D 4/02* (2006.01)

(52) U.S. Cl.
CPC ............... *G01D 5/202* (2013.01); *G01D 4/02* (2013.01)

(58) Field of Classification Search
CPC .......... G01D 5/20; G01D 5/202; G01D 5/244; G01D 5/24461; G01D 5/34; G01D 5/344;
(Continued)

(56) References Cited

U.S. PATENT DOCUMENTS 4,660,035 A * 4/1987 Hoffman ................. G01R 11/16
340/870.02
4,704,907 A * 11/1987 Mannherz ................. G01F 1/60
73/861.17

(Continued)

FOREIGN PATENT DOCUMENTS

DE       41 37 695 A1      5/1993
EP        0 408 084 A1      1/1991
EP        0 467 753 A1      1/1992

*Primary Examiner* — Thang X Le
(74) *Attorney, Agent, or Firm* — Muncy, Geissler, Olds & Lowe, P.C.

(57) ABSTRACT

A device for counting turns of a rotating member (8) rotating about an axis with respect to a housing (100), comprising a wheel (6) made from non-metal material rotatably connected to the rotating member and provided locally with at least one eccentric metal mass (7) leaving a part of the wheel uncovered, at least two coils (1, 2) that are separated from each other and fixedly mounted with respect to the housing facing a portion of the trajectory of the metal mass in such a way that at least all of the coils except one are always responsive to said metal mass and that each belong to an inductive circuit (10.1, 10.2) electrically connected to a counting unit (5). A counter incorporating such a device.

15 Claims, 5 Drawing Sheets

(58) Field of Classification Search
CPC . G01D 5/345; G01D 5/12; G01D 4/02; G01F 1/56; G01F 1/02; G01F 1/05; G01F 1/58; G01F 1/08; G01F 15/06; G01F 15/063; G01F 15/075; G01F 15/0755; G01F 15/066; G01F 15/068
See application file for complete search history.

(56) References Cited

U.S. PATENT DOCUMENTS

| | | | | |
|---|---|---|---|---|
| 5,714,882 | A * | 2/1998 | Mehnert | G01D 3/08 324/207.12 |
| 5,721,383 | A * | 2/1998 | Franklin | G01F 1/075 73/861.77 |
| 5,838,258 | A * | 11/1998 | Saar | G01D 4/004 340/870.11 |
| 7,098,654 | B2 * | 8/2006 | Mehnert | G01P 3/487 324/207.24 |
| 2013/0197831 | A1 * | 8/2013 | Yonezawa | G01F 1/56 702/47 |

* cited by examiner

DEVICE FOR COUNTING TURNS OF A WHEEL BY MEANS OF A COIL AND COUNTER EQUIPPED WITH SAID COUNTING DEVICE

The present invention relates to counting revolutions of a rotary element, e.g. in the field of mechanical meters such as those used for distributing gas, water, or electricity. The invention also relates to such a meter.

A known gas meter comprises a rotary element that is rotatable about an axis relative to a structure in such a manner that the speed of rotation of the rotary element is representative of the quantity of gas delivered. The meter includes a counter device for counting the number of revolutions of the rotary element, the device comprising an eccentric magnet fastened to the rotary element and a magnetic relay, e.g. of the reed bulb type, that is electrically powered and mounted in stationary manner relative to the structure, being connected to a counter circuit for detecting the passage of the magnet and thus for counting the number of revolutions. A drawback of such devices is their consumption of electricity, which means that they cannot operate for long durations on a battery, and another is their sensitivity to fraud since the presence of a magnetic field from any source can disturb the operation of the device. A counter device is also known in which the magnet is replaced by a piece of metal and the magnetic relay is replaced by a coil of a resonant circuit. That type of device provides an improvement that is only partial over counter devices with a magnet.

One fraudulent technique is to move the detector (the magnetic relay or the coil) away from the rotary element so that the detector is no longer in register with the rotary element, thereby making the detector inoperative. In such meters, the rotary element and the counter device are enclosed in an external housing to which the counter device is fastened by a screw that is accessible from outside the housing. In an attempted fraud, the screw is removed so that the counter device shifts relative to the rotary element, thereby preventing the counter device from detecting rotation of the rotary element.

It is known to detect movement of the counter device, and thus the attempted fraud, by means of a switch that is actuated when the housing is removed. The reliability of such detection nevertheless assumes relatively tight manufacturing tolerance. It is also known to have recourse to magnetic or inductive means without those solutions giving rise to full satisfaction.

An object of the invention is to improve existing counter devices.

To this end, the invention provides a counter device for counting revolutions of a rotary element about an axis relative to a structure, the device comprising a wheel made of non-metallic material that is constrained to rotate with the rotary element and that is provided locally with at least one eccentric metal mass that leaves a portion of the wheel uncovered, at least two coils that are spaced apart from each other and mounted stationary relative to the structure facing a portion of the path of the metal mass in such a manner that at least all of the coils except for one are always sensitive to said metal mass, the metal mass being arranged to limit coupling between the coils, each of which belongs to an inductive circuit that is electrically connected to a counter unit arranged to: issue a voltage pulse periodically and substantially simultaneously pulse into each inductive circuit at an issuing frequency that is greater than or equal to four times the predetermined maximum frequency of rotation of the wheel; detect an oscillating voltage signal output by each inductive circuit and compare it with a reference voltage in order to count the number of oscillations in the signal that are greater than the reference voltage; and increment a revolution counter by one on each occasion, for one of the inductive circuits, that this number of oscillations greater than the reference voltage lies in a first predetermined range of values while, and for each of the other inductive circuits, that this number lies in a second predetermined range of values having no overlap with the first range.

When the metal part is close to the coil, the coil is subjected to the influence of the metal mass such that the damping properties of the inductive circuit lead to a reduction in the voltage level of the damped oscillating signal generated by the coil. Thus, the voltage pulse is not damped in the same manner when in the presence or in the absence of the metal mass. The counting is based on detecting the number of oscillations that present a maximum amplitude that is greater than the reference voltage. Counting in this way is reliable and relatively insensitive to attempted fraud. In addition, the counter device is not powered permanently, but only while it is injecting the voltage pulse into the inductive circuit, detecting the oscillating signal, making the comparison, and performing incrementation. The counter device thus consumes very little energy and can be powered by a battery for a relatively long duration. It should be observed that the metal mass is always detected by at least one of the coils. Thus, in the event of the coils being moved relative to the wheel, none of the coils detecting the metal mass reveals an attempted fraud. The use of two inductive circuits makes it possible to increase the reliability of the counting (counting half-revolutions and avoiding uncertainty when the metal mass is in the vicinity of one of the coils but without facing it), and makes it possible to reduce sensitivity to fraud since the counting assumes that only one of the coils is not being subjected simultaneously to the influence of the metal mass.

Preferably, the counter unit is arranged to perform an operation of adjusting the pulse voltage for each inductive circuit in such a manner that the number of oscillations of the oscillating signal that are greater than the reference voltage and less than the predetermined threshold lies in the second predetermined range when in the presence of the metal mass facing the coil, and lies in the first predetermined range when in the absence of the metal mass.

The characteristics of the inductive circuits are properties (resonant frequency, voltage level of the oscillating signal) that can vary over time or as a function of temperature.

In a particular embodiment, the wheel is provided with peripheral gear teeth and a first gearwheel is secured to the rotary element in order to transmit the motion of the rotary element to the wheel.

Thus, the wheel is not fastened directly to the rotary element, which gives greater freedom in positioning it and in positioning the inductive circuit.

Under such circumstances, and advantageously, a second gearwheel meshes with the wheel and with the first gearwheel in order to transmit the turning motion of the first gearwheel to the wheel, and the gearwheels and the wheel are of diameters such that the wheel has a frequency of rotation that is less than the frequency of rotation of the first gearwheel.

By reducing the frequency of rotation of the wheel, it is possible to limit the frequency at which voltage pulses are issued and thus to limit the power consumption of the meter device.

Preferably, the counter unit is arranged to signal a fraud if any one of the following conditions is true:
- the sum of the number of oscillations greater than the reference voltage in a given counting operation is greater than or equal to a second predetermined threshold;
- the number of oscillations greater than the reference voltage is less than a third predetermined threshold or greater than a fourth predetermined threshold for at least one of the coils; and
- the number of oscillations greater than the reference voltage in a given counting operation is greater than a fifth predetermined threshold for at least two of the N coils.

Advantageously, if the number of oscillations greater than the reference voltage in a given counting operation is greater than the fifth predetermined threshold for all of the coils, the counter unit is arranged to issue a predetermined particular signal to signal a tear-out type fraud.

The invention also provides a meter fitted with a counter device of the above-specified type.

Other characteristics and advantages of the invention appear on reading the following description of particular, non-limiting embodiments of the invention.

Reference is made to the accompanying drawings, in which.

The invention is described herein in application to a gas meter for installing in private premises in order to connect a gas distribution installation in the premises to an external gas distribution network. Naturally, the invention is not limited to this application and also applies, in particular, to water meters, electricity meters, . . . .

With reference to FIGS. 1 to 8c, the meter comprises a structure forming a housing 100 in which there arrives gas feed pipe 101 that is connected to the external distribution network, and from which there leaves a gas distribution pipe 102 for the installation. The two pipes are connected together by a coupling 3 in which there extends a portion of a rotary element 4 that is driven in rotation by the gas flowing through the coupling from the pipe 101 to the pipe 102 in such a manner that the rotation of the rotary element 4 is representative of the quantity of gas passing through the coupling 3. This arrangement is itself known and is not described in greater detail herein.

Figure 1:
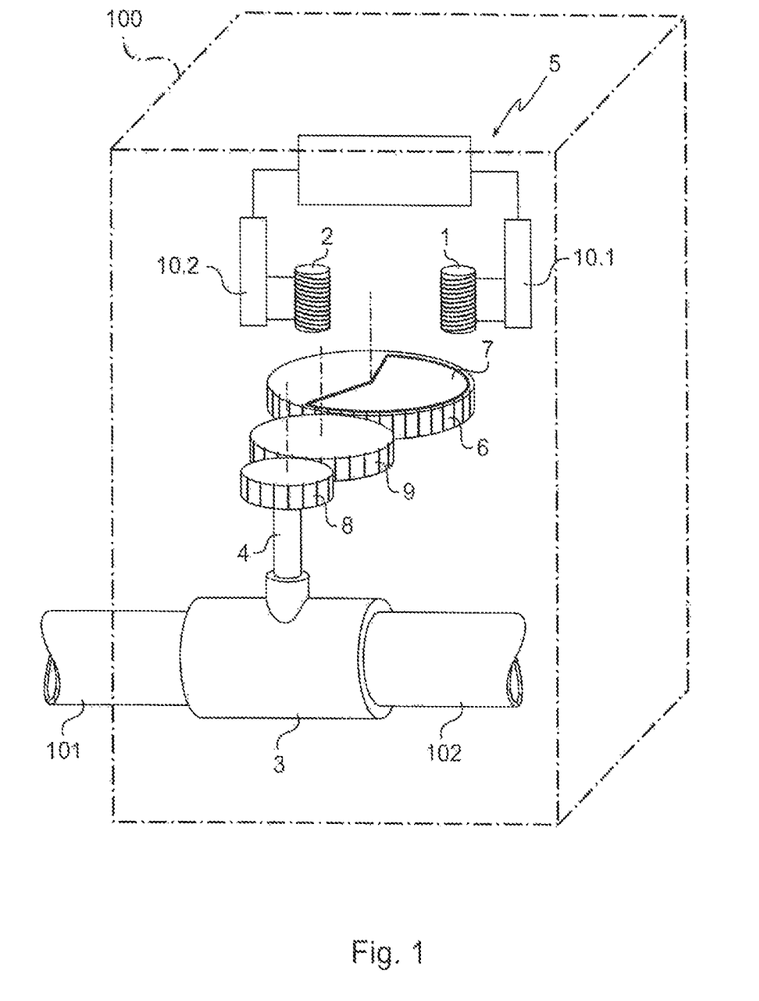
FIG. 1 is a diagrammatic perspective view of a meter in a first embodiment of the invention.
Figure 2:
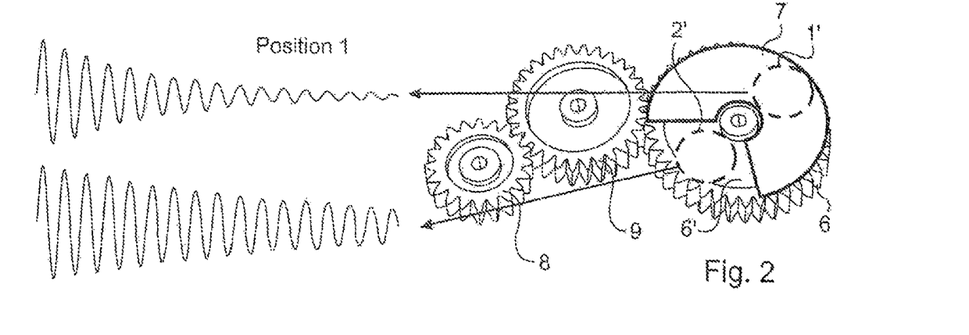
FIG. 2 is a diagrammatic view of a counter device of the invention for one position of the rotary element, in association with the appearances of the inductive signals produced by each of the inductive circuits.
Figure 3:
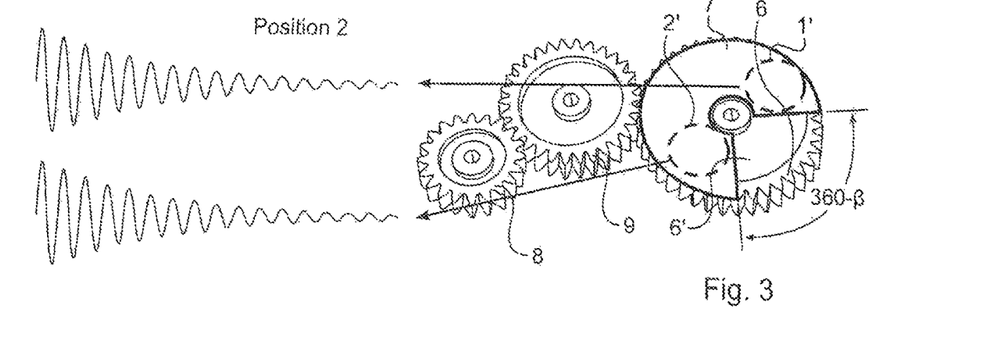
FIGS. 3 to 5 are views analogous to FIG. 2 showing the counter device for other positions of the rotary element.
Figure 4:
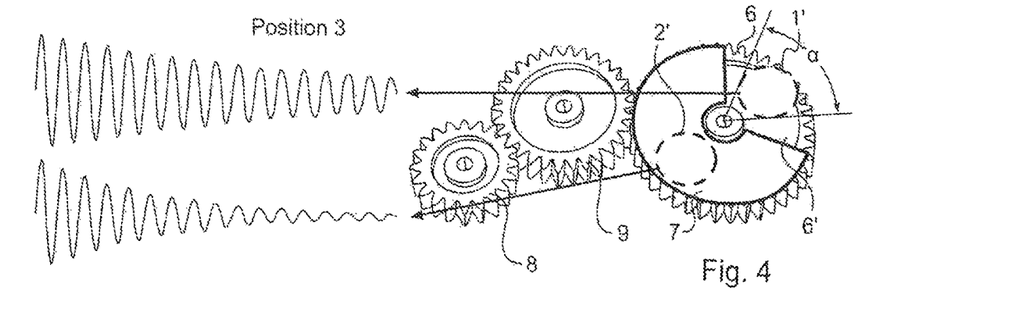
Figure 5:
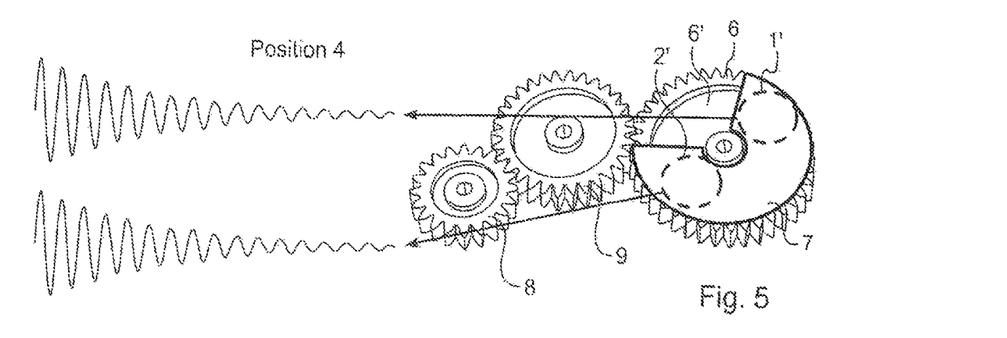

The meter further comprises a counter device, given overall reference 5, for counting the revolutions of the rotary element 4. The counter device 5 comprises a wheel 6 made of non-metallic material that is constrained to rotate with the rotary element 4 and that is locally provided with at least one eccentric metal mass 7 in the form of an angular sector adjacent to the periphery of the wheel 6 and leaving uncovered a portion 6' of the wheel 6. In this example, the metal mass 7 occupies a little more than half of the wheel 6. The wheel 6 has peripheral gear teeth and a first gearwheel 8 is secured to the rotary element 4 in order to transmit the motion of the rotary element 4 to the wheel 6 via a second gearwheel 9 meshing both with the wheel 6 and with the first gearwheel 8. The gearwheels 8 and 9, and the wheel 6 are of diameters such that the wheel 6 rotates at a frequency that is lower than the frequency at which the first gearwheel 8 rotates. In this example, the wheel 6 rotates at half the rate of the first gearwheel 8.

Figure 6:
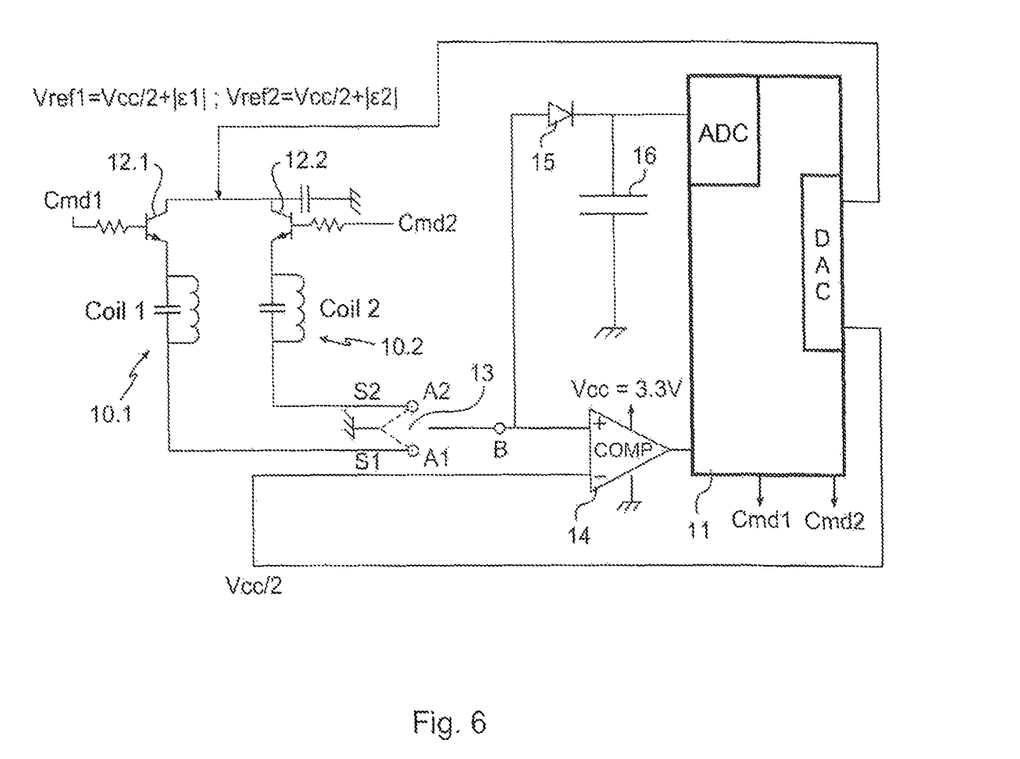
FIG. 6 is a circuit diagram of the counter device.

The counter device 5 also has two resonant inductive circuits, given overall references 10.1 and 10.2, that are connected to a counter unit that includes a microcontroller 11 in this example.

Each inductive circuit 10.1, 10.2 has a respective coil 1, 2, each mounted stationary relative to the housing 100 and each facing a portion of the path followed by the metal mass 7 (only the projections 1' and 2' of the coils 1 and 2 on the wheel 6 are shown in FIGS. 2 to 5). The coils 1 and 2 are spaced apart from each other so that each coil 1, 2 senses in succession the metal mass 7, while ensuring that the metal mass 7 is always being sensed by at least one of the two coils, i.e. ensuring that at any instant t, it is possible for only one of the two coils 1 and 2 not to be subjected to the influence of the metal mass 7, while the other one of the coils 1 and 2 is necessarily being influenced. In addition, the metal mass 7 occupies an angle β (in degrees) equal to:

$$\beta = 360/N + \alpha$$

where N is the number of coils and a is the angle in degrees of an angular sector of the wheel 6 occupied by a projection of one of the coils on the wheel. In this example, the angle β is thus equal to 180+α. It should be observed that this angle value makes it possible to ensure that at least one of the two coils is always sensing said metal mass 7, while conserving an uncovered portion of the wheel 6 that is sufficient to ensure reliable counting.

Each coil 1, 2 has a top end connected to a digital-to-analog converter DAC of the microcontroller 11 by a respective switch 12.1, 12.2 and a bottom end connected to a respective terminal A1, A2 of a switch 13 having a third terminal connected to ground and a fourth terminal B connected to the positive input of a comparator 14. The comparator 14 has a negative input connected to the digital-to-analog converter of the microcontroller 11 and an output connected to an input of the microcontroller 11 that incorporates a mechanism for counting the rising fronts at the output from the comparator that delivers a signal in the form of squarewave pulses, e.g. at 3.3 volts (V) (it would be equally possible to count the falling fronts instead of the rising fronts).

The terminal B of the switch 13 is connected via a diode 15 to an analog-to-digital converter ADC of the microcontroller 11. A capacitor 16 is connected between the cathode of the diode 15 and ground in order to form an envelope detector for detecting the envelope of the signal arriving via the terminal B of the switch 13.

The microcontroller 11 controls the transistors 12.1 and 12.2 to switch between their ON and OFF states by means of command signals Cmd1 and Cmd2.

The counter unit is arranged to perform a counting operation by implementing the following steps:

periodically, and quasi-simultaneously, issuing a respective voltage pulse Vref1, Vref2 in each inductive circuit 10.1, 10.2 via another digital-to-analog converter output of the microcontroller 11, at an issuing frequency greater than a predetermined maximum frequency of rotation of the wheel 6, and equal to not less than four times said maximum frequency so as to be able to count the revolutions of the wheel 6 without error using said inductive circuits;

detecting respective oscillating voltage signals S1, S2 output by the inductive circuits 10.1 and 10.2, and comparing them with a reference voltage Vcc/2; and incrementing a stored number of revolutions CT after the inductive circuits 10.1 and 10.2 have successively delivered respective oscillating signals having respective numbers M1, M2 of oscillations greater than the reference voltage and less than the predetermined threshold.

It can be understood that the inductive circuit 10.1, 10.2 damps the voltage pulse and supplies an oscillating signal. Depending on whether the metal mass 7 is or is not present under the coil, the damping produced by the inductive circuit 10.1, 10.2 is modified (see FIGS. 2 to 5).

The respective voltages of the pulses Vref1 and Vref2 are adjusted beforehand (e.g. in the factory) so as to be slightly greater than the reference voltage Vcc/2, and in this example these voltages are equal respectively to Vcc/2+|ε1| and Vcc/2+|ε2|. The values of these voltages serve to adjust the numbers M1 and M2 of the oscillating signal in the presence and in the absence of the metal mass 7.

The operation of the invention is described in greater detail below.

Figure 7:
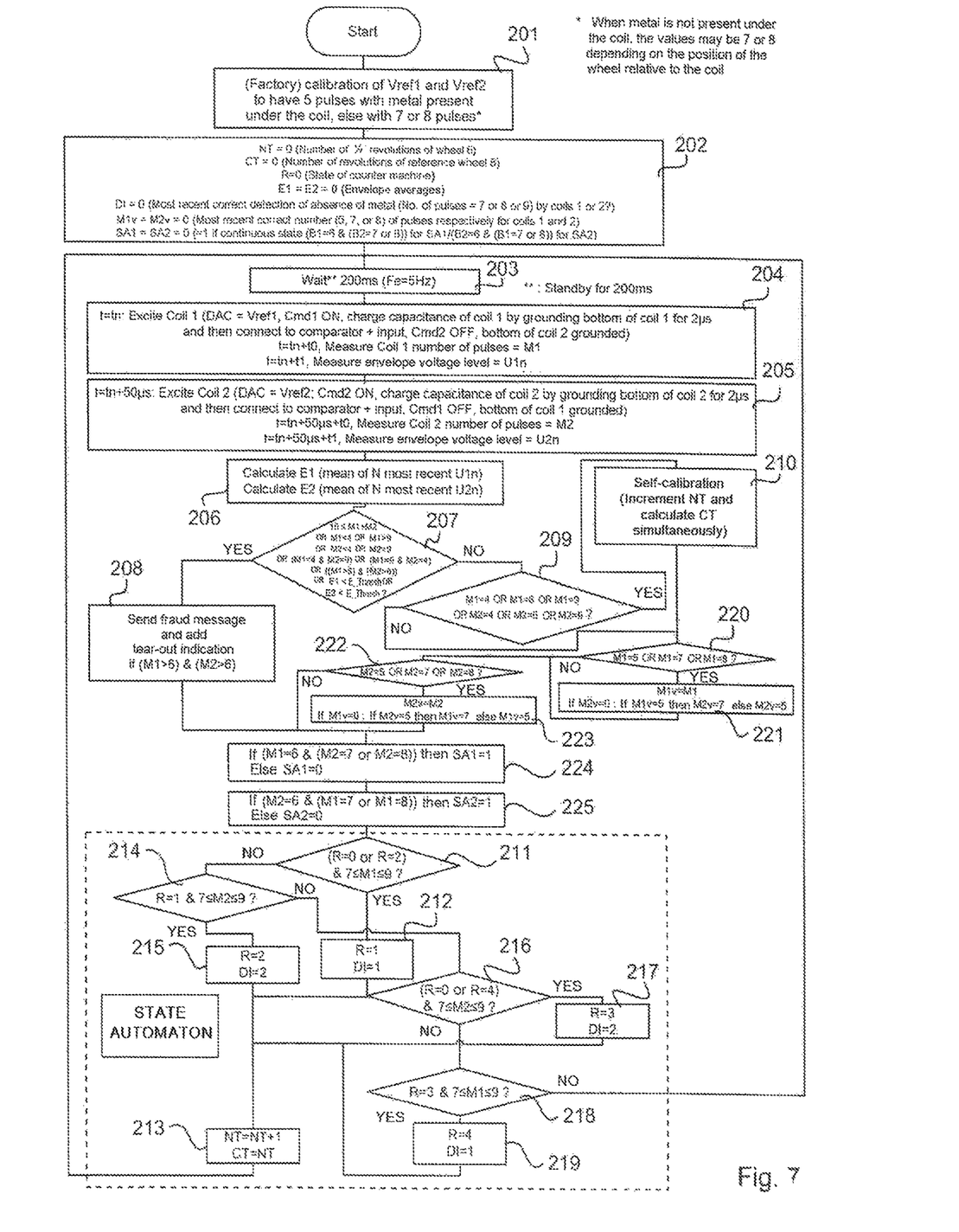
FIG. 7 is a flow chart showing the operation of the counter device.

It is preferable to perform a calibration step (201) in the factory. For each inductive circuit 10.1, 10.2, the voltage Vref1, Vref2 is calibrated in such a manner that:

in the presence of metal, the number M1, M2 of oscillations greater than the reference voltage is equal to 5; and in the absence of the metal mass 7 under the coil 1 or 2, the number of oscillations M1 or M2 greater than the reference voltage is equal to 7 or 8.

This amounts to defining a threshold equal to 6, with the difference of 2 between the two values for the number making it possible to distinguish clearly between the absence and the presence of the metal mass.

Thereafter, operating variables of the counter device are initialized (step 202):

Nt is the number of half-revolutions of the wheel 6 (i.e. in theory the number of revolutions of the rotary element 4);

CT is the number of revolutions of the rotary element 4;

R is a state variable of the counter unit;

DI indicates which is the most recent coil to have detected 7, 8, or 9 pulses (value 1 if it is the coil 1 and value 2 if it is the coil 2);

M1v and M2v indicate the most recent correct value (5, 7, or 8) measured for each coil;

SA1 (or SA2) is a flag signal that is equal to 1 so long as the system is in a state in which 6 is measured for coil 1 and 7 or 8 for coil 2 (or for SA2 6 for coil 2 and 7 or 8 for coil 1), or else that is equal to 0;

U1n and U2n represent the envelope voltage levels; and

E1 and E2 represent the mean values of the envelopes of the oscillating signals S1 and S2 (mean of the N most recent U1n, U2n).

Once the meter is installed, and in its normal mode of operation, the counter device is put on standby for 200 milliseconds (ms) (step 203) in order to save energy. This corresponds to a sampling frequency of 5 hertz (Hz), it being understood that in the embodiment described, the maximum frequency of rotation of the wheel 6 is 0.5 Hz. It is equally possible to work at a different sampling frequency, e.g. 7 Hz, which would then correspond to a sampling period of 143 ms instead of 200 ms.

The transistors 12.1 and 12.2 are then in the OFF state and the switch 13 connects both coils 1 and 2 to ground.

At an instant t=tn, the coil 1 is excited by injecting the voltage pulse. For this purpose, the transistor 12.1 is put into its ON state, and after 2 microseconds (μs) (the capacitance of the coil 1 is then charged), the switch 13 is controlled to connect the coil 1 to the positive input of the comparator 14 and to supply the signal S1 thereto. At t=tn+t0, the number M1 is determined, and at t=tn+t1, the voltage level U1n is determined (step 204).

At the instant t=tn+50 μs, the coil 2 is excited by injecting the voltage pulse. For this purpose, the transistor 12.2 is put into its ON state, and after 2 μs (the capacitance of the coil 2 is then charged), the switch 13 is operated to connect the coil 2 to the positive input of the comparator 14 and to supply it with the signal S2. At t=tn+50 μs+t0, the number M2 is determined, and at t=tn+50 μs+t1, the voltage level U2n is determined (step 205). Typically, t0=10 μs and t1=20 μs.

The mean values of the envelopes E1 and E2 are then calculated (step 206).

Thereafter, a search is made to determine whether at least one of the following conditions is true:

M1+M2≥16;
M1<4;
M1>9;
M2<4;
M2>9;
M1=4 and M2=9;
M1=9 and M2=4;
M1>6 and M2>6;
E1 is less than a predetermined threshold E_thresh; and
E2 is less than a predetermined threshold E_thresh.

Figure 8A:
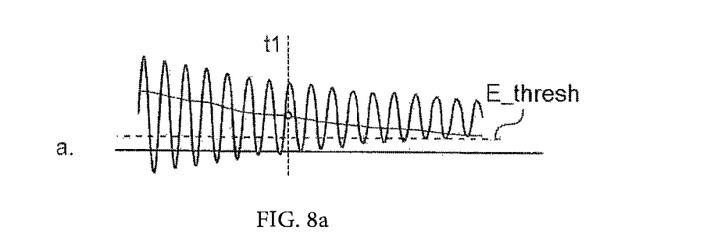
FIGS. 8a, 8b, and 8c show the appearance of the oscillating signal in the absence of the metal mass, in the presence of the metal mass, and in the presence of a fraud.
Figure 8B:
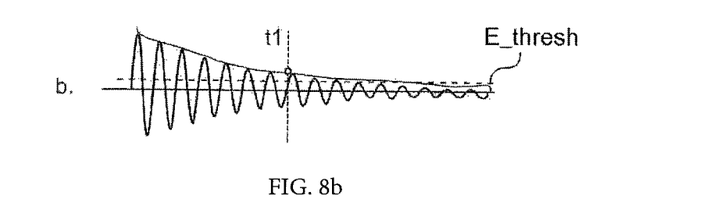
Figure 8C:
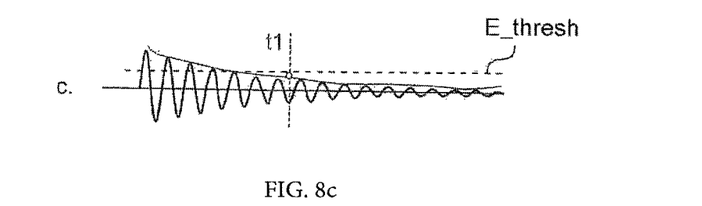

If any of these conditions is true, a fraud alert is issued (step 208), with an indication specifying tearing-out when M1>6 and M2>6. In particular, concerning these two conditions, and by comparing FIGS. 8a, 8b, and 8c, it can be seen that:

the mean value of the envelope of the signal in the absence of the metal mass 7 and in the absence of an external metal mass (FIG. 8a) is greater than the mean value of the envelope of the signal in the presence of the metal mass 7 and in the absence of an external metal mass (FIG. 8b); and the mean value of the envelope of the signal in the presence of the metal mass 7 and in the absence of an external metal mass (FIG. 8b) is greater than the mean value of the envelope of the signal in the presence of an external metal mass (FIG. 8c).

If none of those conditions is true, a search is then made to determine whether at least one of the following conditions is true:

M1=4;
M1=6;
M1=9;
M2=4;
M2=6;
M2=9.

These conditions correspond to a modification to the damping properties of the inductive circuits 10.1, 10.2. If any one of these conditions is true, it is necessary to proceed with a self-calibration step 210. This self-calibration could also be performed periodically, e.g. once every 7 days. Self-calibration is performed like the calibration stage, modifying the values ε1, ε2.

If none of those conditions is true, and also at the end of self-calibration, a search is made to determine whether any of the following conditions is true (step 220):
M1=5;
M1=7;
M1=8.

If at least one of these conditions is true, the value M1 is given to M1v, and if M2v=0, then if M1v=5 then M2v=7, else M2v=5 (step 221), and the method moves on to step 222. If none of these conditions is true, the method moves on to step 222.

Thereafter, a search is made to determine whether any of the following conditions is true (step 222):
M2=5;
M2=7;
M2=8.

If at least one of these conditions is true, the value M2 is given to M2v, and if M1v=0, then if M2v=5 then M1v=7, else M1v=5 (step 223), and the method moves on to step 224. If none of these conditions is true, the method moves on to step 224.

Thereafter, a search is made to determine whether the following conditions are true (step 224):
M1=6;
M2=7 or M2=8.

If these conditions are true, the value 1 is given to SA1. Else the value 0 is given to SA1.

Thereafter, a search is made to determine whether the following conditions are true (step 225):
M2=6;
M1=7 or M1=8.

If these conditions are true, the value 1 is given to SA2. Else the value 0 is given to SA2.

Thereafter, a search is made to determine whether the following conditions are true (step 211):
R=0 or R=2;
7≤M1≤9.

If these conditions are true, the value 1 is given to R and to DI (step 212) and then the variable NT takes the value NT+1 and the variable CT takes the value NT during an incrementation step 213. Thereafter, the cycle is repeated from putting the counter device on standby (203).

If at least one of these conditions is not true, a search is made to determine whether the following conditions are true (step 214):
R=1;
7≤M2≤9.

If these conditions are true, the value 2 is given to R and to DI (step 215) and then the variable NT takes the value NT+1 and the variable CT takes the value NT during the incrementation step 213. Thereafter, the cycle is repeated from putting the counter device on standby (203).

If at least one of these conditions is not true, a search is made to determine whether the following conditions are true (step 216):
R=0 or R=4;
7≤M2≤9.

If these conditions are true, the value 3 is given to R and the value 2 is given to DI (step 217), and then the variable NT takes the value NT+1 and the variable CT takes the value NT during the incrementation step 213. Thereafter, the cycle is repeated from putting the counter device on standby (203).

If at least one of these conditions is not true, a search is made to determine whether the following conditions are true (step 218):
R=3;
7≤M1≤9.

If these conditions are true, the value 4 is given to R and the value 1 is given to DI (step 219), and then the variable NT takes the value NT+1 and the variable CT takes the value NT during the incrementation step 213. Thereafter, the cycle is repeated from putting the counter device on standby (203).

If at least one of these conditions is not true, the cycle is repeated from putting the counter device on standby (203).

The metal mass 7 may be of a shape other than that described above.

Thus, in a variant, for a number N of coils, the metal mass 7 may comprise N portions of substantially identical areas that are spaced apart in pairs by slots extending over a major fraction of the radius of the wheel, each slot having a width such that its effect is negligible on the oscillating signal.

Figures 9, 10:
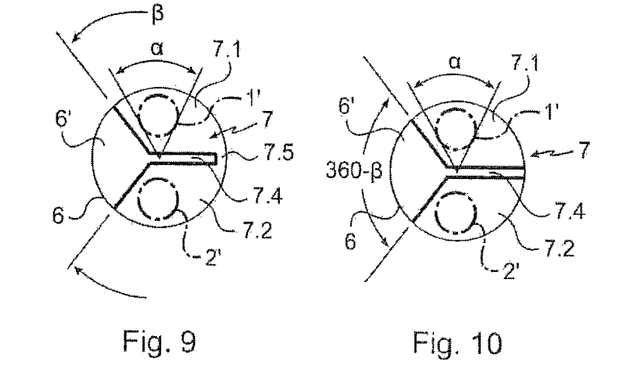
FIG. 9 is a diagrammatic plan view of the wheel of a counter device in a second embodiment of the invention.
FIG. 10 is a view analogous to FIG. 9 for a counter device in a third embodiment of the invention.

With reference to FIG. 9, and in the second embodiment, the metal mass 7 comprises two portions 7.1 and 7.2 of substantially equal areas that are separated in part by a slot 7.4 extending over a major portion of a radius of the wheel 6. In this example, the slot 7.4 does not extend over the entire radius so as to leave a metal portion 7.5 extending in the vicinity of the periphery of the wheel 6. The slot 7.1 leaves uncovered a portion of the wheel 6 that is much smaller than the uncovered portion 6' and that does not impede detection.

With reference to FIG. 10, and in the third embodiment, the metal mass 7 has two portions 7.1 and 7.2 that are of substantially identical areas and that are completely separated by a slot 7.4 extending over an entire radius of the wheel 6.

Figure 11:
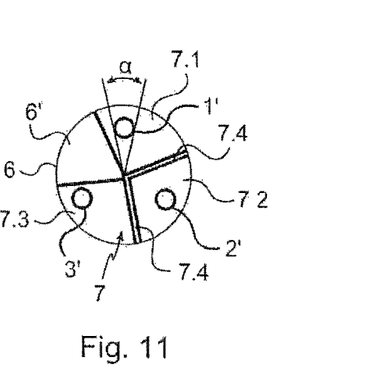
FIG. 11 is a view analogous to FIG. 9 for a counter device in a fourth embodiment of the invention.

With reference to FIG. 11, and in the fourth embodiment, the metal mass 7 comprises three portions 7.1, 7.2, and 7.3 of substantially identical areas and that are completely separated in pairs by slots 7.4 extending over respective entire radii of the wheel 6.

The counter device 5 also has three resonant inductive circuits connected as above to a counter unit.

Each inductive circuit comprises a coil represented in FIG. 11 solely by its projection 1', 2', or 3'. The coils are connected as described above, except in this example they are positioned at 120° relative to one another so that each coil is sensitive in succession to the metal mass 7 and said metal mass 7 is always being sensed by at least two coils, i.e. at any instant t, it is possible for only one of the coils not to be subjected to the influence of the metal mass 7, while the other two coils are necessarily being subjected thereto. In addition, the metal mass 7 extends over an angle β (in degrees) equal to:

$$\beta = 360/N + \alpha$$

with N equal to the number of coils and α equal to the angle in degrees of an angular sector of the wheel 6 in which a projection of one of the coils onto the wheel is contained. In this example, the angle β is 120+α. It should be observed that this angle value makes it possible to ensure that at least two of the three coils are always sensing said metal mass 7, while conserving an uncovered portion of the wheel 6 that is sufficient to enable counting to be reliable. The area of the portion 6' needs to be capable of containing the entire projection of a coil onto the wheel 6 in such a manner that the coils are not sensitive to the metal mass 7 when they are facing the portion 6'.

Naturally, the invention is not limited to the embodiments described but covers any variant coming within the ambit of the invention as defined by the claims.

In particular, the invention is applicable to any mechanical meter.

The counter device could have only one coil.

The counter device need not have a fraud detection device.

The invention claimed is:

1. A counter device for counting revolutions of a rotary element about an axis relative to a structure, the counter device comprising:
   a wheel made of non-metallic material that is constrained to rotate with the rotary element and that is provided locally with at least one eccentric metal mass that leaves a portion of the wheel uncovered,
   at least two coils that are spaced apart from each other and mounted stationary relative to the structure facing a portion of the path of the metal mass such that at least all of the coils except for one are always sensitive to said metal mass,
   the metal mass being arranged to limit coupling between the coils, each of which belongs to inductive circuits that are electrically connected to a counter unit arranged to:
      issue a voltage pulse periodically and substantially simultaneously into each inductive circuit at an issuing frequency that is greater than or equal to four times a predetermined maximum frequency of rotation of the wheel;
      detect an oscillating voltage signal output by each inductive circuit and compare it with a reference voltage in order to count the number of oscillations in the oscillating voltage signal that are greater than the reference voltage; and
      increment a revolution counter by one on each occasion, for one of the inductive circuits, that this number of oscillations greater than the reference voltage lies in a first predetermined range of values while, and for each of the other inductive circuits, that this number lies in a second predetermined range of values having no overlap with the first predetermined range.

2. A device according to claim 1, wherein the metal mass extends over an angle β (in degrees) equal to:

β=360/N+α with N being the number of coils and α being the angle of an angular sector of the wheel in which a projection of the coil onto the wheel is contained.

3. A device according to claim 1, wherein the metal mass is in the form of a portion of an annulus adjacent to the periphery of the wheel.

4. A device according to claim 1, wherein, for a number N of coils, the metal mass comprises N portions of areas that are substantially identical and that are spaced apart in pairs by slots extending over a major portion of a radius of the wheel, each slot having a width such that it has a negligible effect on the oscillating signal.

5. A device according to claim 1, wherein the counter unit is arranged to perform an operation of adjusting the voltage pulse for each inductive circuit such that the number of oscillations of the oscillating voltage signal that are greater than the reference voltage and less than a predetermined threshold lies in the second predetermined range when in the presence of the metal mass facing the coil, and lies in the first predetermined range when in the absence of the metal mass.

6. A device according to claim 5, wherein the difference between the first predetermined range value and the second predetermined range value is equal to two.

7. A device according to claim 1, wherein the counter unit is arranged to signal a fraud if any one of the following conditions is true:
   the sum of the number of oscillations greater than the reference voltage in a given counting operation is greater than or equal to a second predetermined threshold;
   the number of oscillations greater than the reference voltage is less than a third predetermined threshold or greater than a fourth predetermined threshold for at least one of the coils; and
   the number of oscillations greater than the reference voltage in a given counting operation is greater than a fifth predetermined threshold for at least two of the N coils.

8. A device according to claim 1, wherein counting the number of oscillations greater than the reference voltage begins after a predetermined length of time in order to avoid transient effects.

9. A device according to claim 1, wherein the wheel is provided with peripheral gear teeth and a first gearwheel is secured to the rotary element in order to transmit the motion of the rotary element to the wheel.

10. A device according to claim 9, wherein a second gearwheel meshes with the wheel and with the first gearwheel in order to transmit the turning motion of the first gearwheel to the wheel.

11. A device according to claim 10, wherein the gearwheels and the wheel are of diameters such that the wheel has a frequency of rotation that is less than the frequency of rotation of the first gearwheel.

12. A device according to claim 1, including a unit for detecting fraud that is arranged to determine an envelope shape for the oscillating voltage signal and to search for an alteration of the envelope.

13. A device according to claim 7, wherein, if the number of oscillations greater than the reference voltage in a given counting operation is greater than the fifth predetermined threshold for all of the coils, the counter unit is arranged to issue a predetermined particular signal to signal a tear-out type fraud.

14. A mechanical meter including a housing containing a rotary element and a device according to claim 1.

15. A meter according to claim 14, wherein the wheel is provided with peripheral gear teeth and a first gearwheel is secured to the rotary element in order to transmit the motion of the rotary element to the wheel, which wheel is arranged towards a rear face of the housing.

* * * * *